(12) United States Patent
Plotnik et al.

(10) Patent No.: US 9,729,538 B2
(45) Date of Patent: Aug. 8, 2017

(54) SYSTEM, METHOD AND PROCESS FOR DETECTING ADVANCED AND TARGETED ATTACKS WITH THE RECOUPLING OF KERBEROS AUTHENTICATION AND AUTHORIZATION

(71) Applicant: Microsoft Israel Research and Development (2002) Ltd, Haifa (IL)

(72) Inventors: Idan Plotnik, Savyon (IL); Tal Arieh Be'ery, Petach Tikva (IL); Michael Dolinsky, Netanya (IL); Ohad Plotnik, Savyon (IL); Gregory Messerman, Herzliya (IL); Sivan Krigsman, Herzliya (IL)

(73) Assignee: Microsoft Israel Research and Development (2002) Ltd, Haifa (IL)

( * ) Notice: Subject to any disclaimer, the term of this patent is extended or adjusted under 35 U.S.C. 154(b) by 0 days.

(21) Appl. No.: 14/474,198

(22) Filed: Sep. 1, 2014

(65) Prior Publication Data
US 2016/0065565 A1    Mar. 3, 2016

(51) Int. Cl.
*H04L 29/06* (2006.01)
*G06F 21/33* (2013.01)

(52) U.S. Cl.
CPC ........ *H04L 63/0807* (2013.01); *G06F 21/335* (2013.01); *H04L 63/14* (2013.01); *H04L 63/1416* (2013.01)

(58) Field of Classification Search
CPC ................. H04L 63/0807; H04L 63/1416
See application file for complete search history.

(56) References Cited

U.S. PATENT DOCUMENTS

| | | | |
|---|---|---|---|
| 7,231,663 B2* | 6/2007 | Medvinsky | H04L 63/0807 713/155 |
| 7,421,083 B2* | 9/2008 | Medvinsky | H04L 9/0822 380/273 |
| 2004/0162787 A1 | 8/2004 | Madison et al. | |

(Continued)

FOREIGN PATENT DOCUMENTS

EP    2119094 A1    11/2009

OTHER PUBLICATIONS

Chandra, P., "Bulletproof Wireless Security: GSM, UMTS, 802.11 and Ad Hoc Security," Elsevier Communications Engineering Series, Jun. 14, 2005, Burlington, MA, 273 pages.

(Continued)

*Primary Examiner* — Fatoumata Traore
*Assistant Examiner* — Khoi Le
(74) *Attorney, Agent, or Firm* — Alleman Hall Creasman & Tuttle LLP

(57) ABSTRACT

A method, system and computer program for recoupling Kerberos Authentication and Authorization requests, the method including the steps of: (a) extracting authorization information, including a copy of a Ticket Granting Ticket (TGT), from an authorization request; (b) retrieving authentication information including the TGT, the authentication information having been previously extracted from an authentication transaction and stored; (c) cross-referencing the extracted authorization information with the retrieved authentication information, such that a discrepancy between the cross-referenced information invokes a security event alert.

10 Claims, 6 Drawing Sheets

(56) References Cited

U.S. PATENT DOCUMENTS

| | | |
|---|---|---|
| 2004/0255241 A1 | 12/2004 | Yamamoto |
| 2008/0104675 A1* | 5/2008 | Kusano ................ H04L 9/3213 726/4 |
| 2009/0178129 A1* | 7/2009 | Cross ................... H04L 9/3213 726/10 |
| 2011/0197073 A1* | 8/2011 | Taraci ..................... G06F 21/10 713/185 |
| 2013/0191631 A1* | 7/2013 | Ylonen ............... H04L 63/1483 713/153 |
| 2013/0254848 A1* | 9/2013 | Ge ....................... G06F 21/335 726/4 |

OTHER PUBLICATIONS

Neuman, C. et al., "The Kerberos Network Authentication Service," Network Working Group, MIT, Available Online at https://www.ietf.org/rfc/rfc4120.txt, Jul. 2005, 100 pages.

"[MS-GLOS]: Windows Protocols Master Glossary," Microsoft Corporation, v20140502, Available Online at http://download.microsoft.com/download/9/5/E/95EF66AF-9026-4BB0-A41D-A4F81802D92C/[MS-GLOS].pdf, May 15, 2014, 126 pages.

ISA European Patent Office, International Search Report and Written Opinion Issued in Application No. PCT/IB2015/056643, Jan. 4, 2016, WIPO, 8 pages.

\* cited by examiner

Kerberos Authentication Flow

PRIOR ART

SYSTEM, METHOD AND PROCESS FOR DETECTING ADVANCED AND TARGETED ATTACKS WITH THE RECOUPLING OF KERBEROS AUTHENTICATION AND AUTHORIZATION

BACKGROUND OF THE INVENTION

1. Field of the Invention

The present invention relates to cyber security and, more particularly, to a system, method and process for Detecting Advanced and Targeted Attacks with the Recoupling of Kerberos Authentication and Authorization.

2. Background Information

Kerberos is an Authentication protocol, standardized and maintained by the IETF (mainly in RFC 4120[1]) and implemented by many Operating Systems (OS), including but not limited to Windows, Linux and Mac OSX. The Kerberos authentication protocol enables the transparent Single Sign On (SSO) experience. The SSO enables users to actively authenticate (i.e. provide a password) only once even though the same user accesses various services—whether in the corporate network or in the Cloud. In federation scenarios, the Kerberos ticket is translated into SAML (Security Assertion Markup Language) tokens.

[1] https://www.ietf.org/rfc/rfc4120.txt, The Kerberos Network Authentication Service (V5), C. Neuman, T. Yu, S. Hartman, K. Raeburn, MIT, July 2005

SUMMARY OF THE INVENTION

According to the present invention there is provided a method for recoupling Kerberos Authentication and Authorization requests, the method includes the steps of: (a) extracting authorization information, including a copy of a Ticket Granting Ticket (TGT), from an authorization request; (b) retrieving authentication information including the TGT, the authentication information having been previously extracted from an authentication transaction and stored; (c) cross-referencing the extracted authorization information with the retrieved authentication information, such that a discrepancy between the cross-referenced information invokes a security event alert.

According to further features in preferred embodiments of the invention described below the security event alert is invoked based on a failure to retrieve the stored authentication information in step (b).

According to still further features in the described preferred embodiments the authentication transaction is passively observed.

According to still further features the authentication transaction is intercepted.

According to still further features the discrepancy includes the authentication information including stale authentication data.

According to another embodiment there is provided a non-transient computer readable medium storing computer readable code that, upon execution of the code by a computer processor, causes the computer processor to: (a) extract authorization information including a copy of a Ticket Granting Ticket (TGT), from an authorization request; (b) retrieve authentication information including the TGT, the authentication information having been previously extracted from an authentication transaction and stored; and (c) cross-reference the extracted authorization information with the retrieved authentication information, such that a discrepancy between the cross-referenced information invokes a security event alert.

According to still further features the security event alert is invoked based on a failure to retrieve the stored authentication information in step (b).

According to still further features the authentication transaction is passively observed.

According to still further features the authentication transaction is intercepted.

According to still further features the discrepancy includes the authentication information including stale authentication data.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a Security Device (SD) according to the present invention may be better understood with reference to the drawings and the accompanying description.

The present invention is adapted to be implemented in a networked Directory Services environment (e.g. a cloud based network environment or an on-premises network environment). A prominent example of a Directory Services (DS) implementation is the Active Directory (AD) service for a Windows network. The Active Directory (AD) service implements the Key Distribution Center (KDC). Therefore, the terms DS, KDC and AD are used interchangeably throughout this document.

Figure 1:
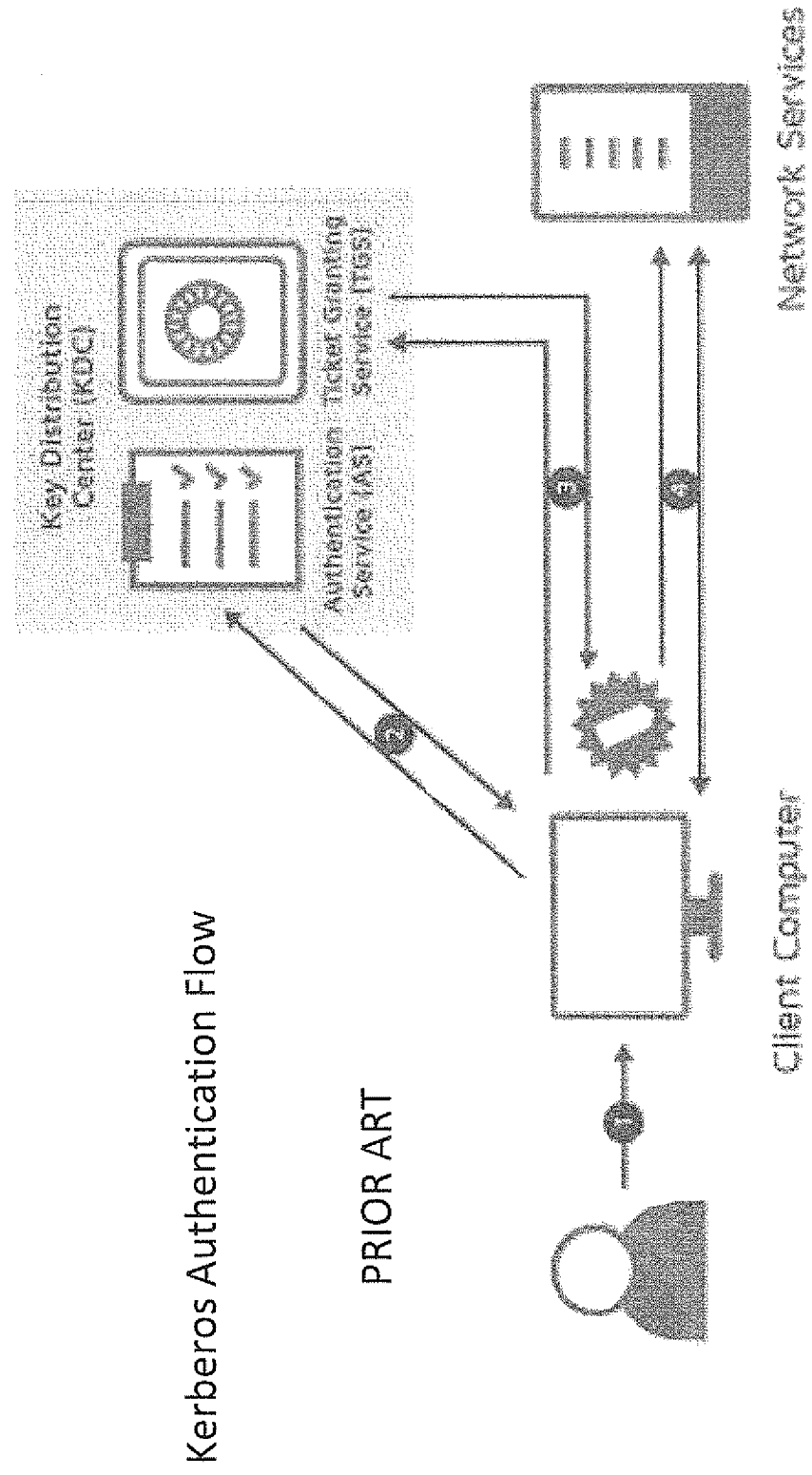
FIG. 1 is a prior art block diagram of the Kerberos Authentication protocol.
Figure 2:
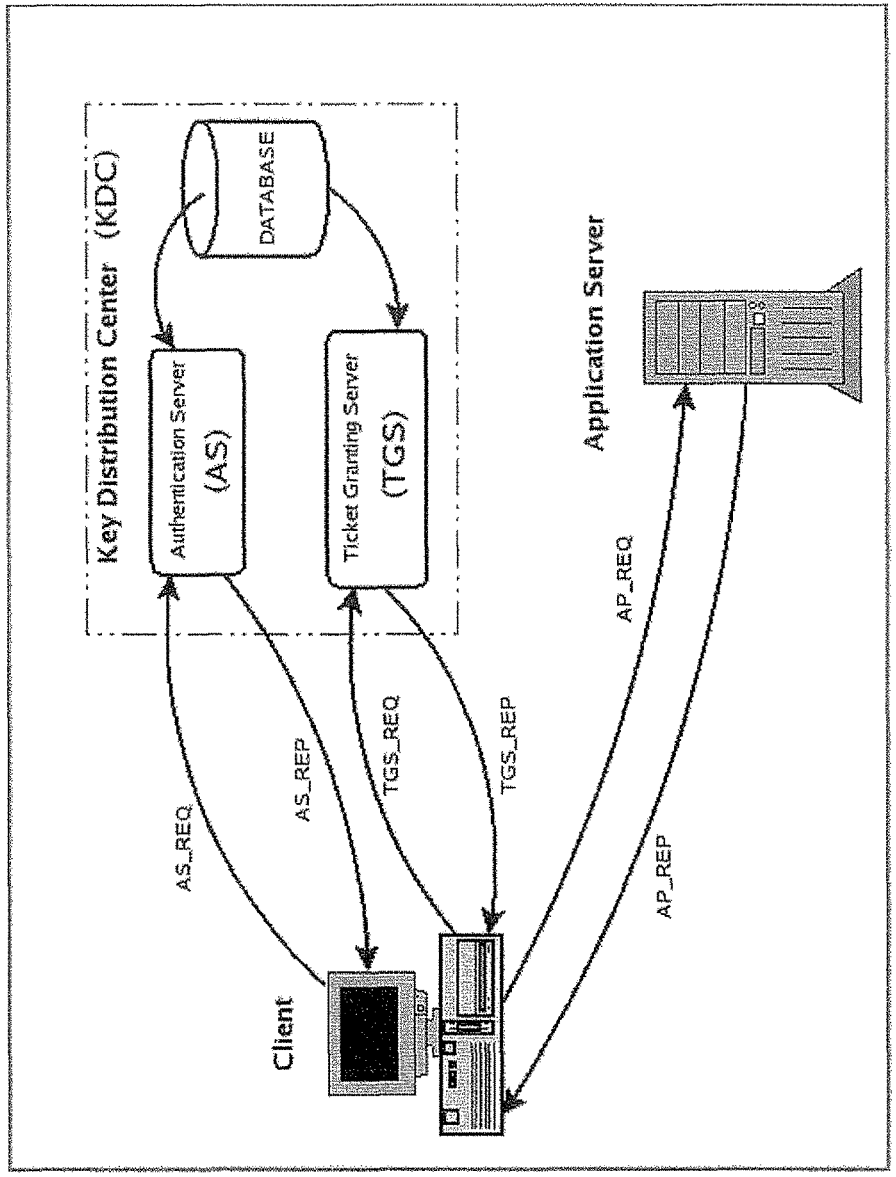
FIG. 2 is a prior art block diagram of the flow of detailed messages in the Kerberos protocol.

FIG. 1 is a prior art block diagram of the Kerberos Authentication protocol. FIG. 2 is a prior art block diagram of the flow of detailed messages in the Kerberos protocol. The Kerberos Authentication protocol works in the following manner:

In step 1, the user or principle provides the Domain Name, user and password in order to access the computer.

In step 2 the computer requests authentication from the Authentication Server (AS) residing on the Key Domain Controller (KDC). Accordingly, the KDC provides the computer with a Ticket Granting Ticket (TGT). The TGT is an identifier which enables the computer to request access to services without the user having to re-submit credentials.

In step 3, each time the computer attempts to access a service, the computer first identifies itself to the KDC, with the TGT that was provided earlier by the AS. The KDC provides the user with a ticket for the particular requested service. The ticket is provided by the Ticket Granting Server (TGS) of the KDC.

In step 4 the user provides the service ticket to the service. Since the ticket was validated by the TGS, the service grants authorization. Accordingly, the connection between the user and the service is established.

Note that for subsequent authorization requests only steps 3 and 4 are repeated and the Authentication Server (AS) is not involved in these transactions. The provided TGT is used as proof that a successful authentication has already taken place.

The user credentials are only used in the preliminary authentication stage. From then on, the Kerberos protocol only uses the TGT ticket for Authorizations. On the one hand, the aforementioned feature improves the efficiency of the protocol. On the other hand, however, the TGT ticket becomes a single point of failure in the authentication and authorization process. Worse yet, Windows does not provide any method to control issued tickets. Specifically, Windows does not provide the ability to revoke a specific ticket.

FIG. 2 details the Kerberos message flow. The client requests Authentication from the AS in an AS_REQ message. The TGT is supplied to the client from the AS in an AS_REP message and quoted/copied by the client on the subsequent authorization requests from the TCS in the TGS_REQ. Authorization is provided to the client in a TGS_REP message. The client is now authorized to approach the Application Server and use the authorized services (AP_REQ and AP_REP message transaction).

One of main engineering achievements of the Kerberos protocol, compared to prior Authentication and Authorization algorithms, is the decoupling the protocol creates between Authentication and Authorization. While prior Authentication and Authorization algorithms (e.g. the NTLM protocol) require the client to re-authenticate for each authorization request, the Kerberos protocol enables the client to authenticate only once in a given time period and that authentication data is saved and can be securely used to authenticate multiple subsequent Authorization requests, thereby achieving greater efficiency.

However, the "decoupling" of Authentication and Authorization opens a door for an attacker. Since authentication data is not explicitly re-verified for each authorization request, an attacker might be able to use invalid authentication data, such as stale authentication data, stolen authentication data and forged authentication data, to successfully gain authorization to systems.

In one embodiment of the present invention, an innovative Security Device (SD) passively monitors Kerberos traffic. The SD "re-couples" each authorization request together with the respective authentication request from which the authorization request originated. In the immediate embodiment, the SD is not placed in the network in an intrusive manner, rather the SD passively monitors a copy of the traffic (e.g. with port mirroring etc.). In an alternative embodiment, the SD is placed within the network chain and all traffic to and from the DS flows through the SD. Placing the SD in the network chain requires all traffic to first flow through the SD, which makes the SD a critical part of the network chain. Being part of the network chain has advantages and disadvantages. For example, one advantage is that the SD has more control over the network traffic. One example of a disadvantage is that if the SD fails for some reason, then the entire network traffic path is compromised.

The Kerberos TGT contains all the relevant authentication and authorization information of the user. The information stored on the TGT enables the KDC to rely solely on the ticket information, without any need to make any further, potentially time consuming, queries. In particular, the TGT ticket contains the following fields:

'Name': the name of the user that the ticket is associated with;

'Start time' and 'End time': the start and end times mark the period during which the ticket is valid. By default, in Windows networks, the validity period is set to ten hours.

'Authorization-data': Authorization data includes details of the privileges and access rights the user has. In Windows, the authorization data takes the form of a Privilege Attribute Certificate (PAC) object. According to Windows Protocols Master Glossary, PAC is defined as "A Microsoft-specific authorization data present in the authorization data field of a ticket. The PAC contains several logical components, including group membership data for authorization, alternate credentials for non-Kerberos authentication protocols, and policy control information for supporting interactive logon."[2]

[2] [MS-GLOS]—v20140502 Windows Protocols Master Glossary Copyright© 2014 Microsoft Corporation, PDF version page 85. Release: Thursday, May 15, 2014

To protect the TGT ticket from being tampered with, the TGT ticket is encrypted with a key that is known only to the KDC. In Active Directory, the key is generated from the KRBTGT service account credentials.

Decoupling Attacks

By re-coupling the authentication and authorization requests, the SD is able to detect 'decoupling attacks' against the Authentication and Authorization system. What follows is an exemplary list of decoupling attacks. This list of attacks is not necessarily comprehensive and other decoupling attacks not detailed hereafter may exist.

One exemplary attack is known as a "Zombie User" attack, where the user uses 'Stale' Authentication Data to access the AD. Since Kerberos authentication and authorization is based solely on the TGT, and not on the user credentials, disabling (or deleting, expiring, purging, etc.) the user account has no effect on the ability of the user to access data and services. The Kerberos protocol creates a peculiar situation in which supposedly "dead" (i.e. disabled) users are actually still very much alive (hence "Zombie Users") and can access the enterprise services. Such users will only be truly disabled when the (TGT) ticket expires, typically after 10 hours.

One exemplary "Zombie User" attack scenario is as follows: A bank employee is terminated from employment. Upon notification of the upcoming termination, the employer IT department immediately disables the employee account in the bank's Active Directory. However, since the employee had just logged into the Active directory account, before the account was disabled, the employee can still access the enterprise data for at least an additional 20 minutes during which time the employee can copy, edit, delete etc. the data. Even though the authentication data is no longer current, the user is still able to use the non-current ('stale') TGT to access the AD.

A second exemplary attack is commonly known as the Stolen Authentication Data or "Pass-the-Ticket" (PtT) attack. In such an attack, the attacker gains access to a machine that a victim has previously authenticated from. By design, Kerberos tickets are stored on the end-user machine. The attacker steals the TGT from the memory of the end user machine and copies ("passes") the ticket to a remote machine to impersonate the victim on the remote machine.

The attacker then connects to various enterprise services from the remote machine, posing as the victim.

From a technical point of view, the attacker is able to access the enterprise services by providing the stolen TGT on the remote machine as the authentication data for the authorization process on the TGS_REQ message.

A third exemplary decoupling attack is commonly known as the "Golden Ticket" attack which uses forged authentication data to gain access to the AD. In a Golden Ticket attack, the attacker gains access (e.g. by hacking) to the Active Directory server itself. The attacker then steals the credentials of the KRBTGT account from AD memory or hard drive. The attacker now forges fake TGTs, using the KRBTGT credentials. The forged ticket can contain arbitrary information including excessive privileges and ticket end time, hence the use of the term "golden".

The forged ticket can be copied ("passed") to any machine to impersonate a victim on that machine. The attacker can now connect to various enterprise services on behalf of the victim from the remote machine. From a technical point of view, the attacker is able to access the enterprise services by providing the forged TGT on the remote machine as the authentication data for the authorization process on the TGS_REQ message.

Figure 3:
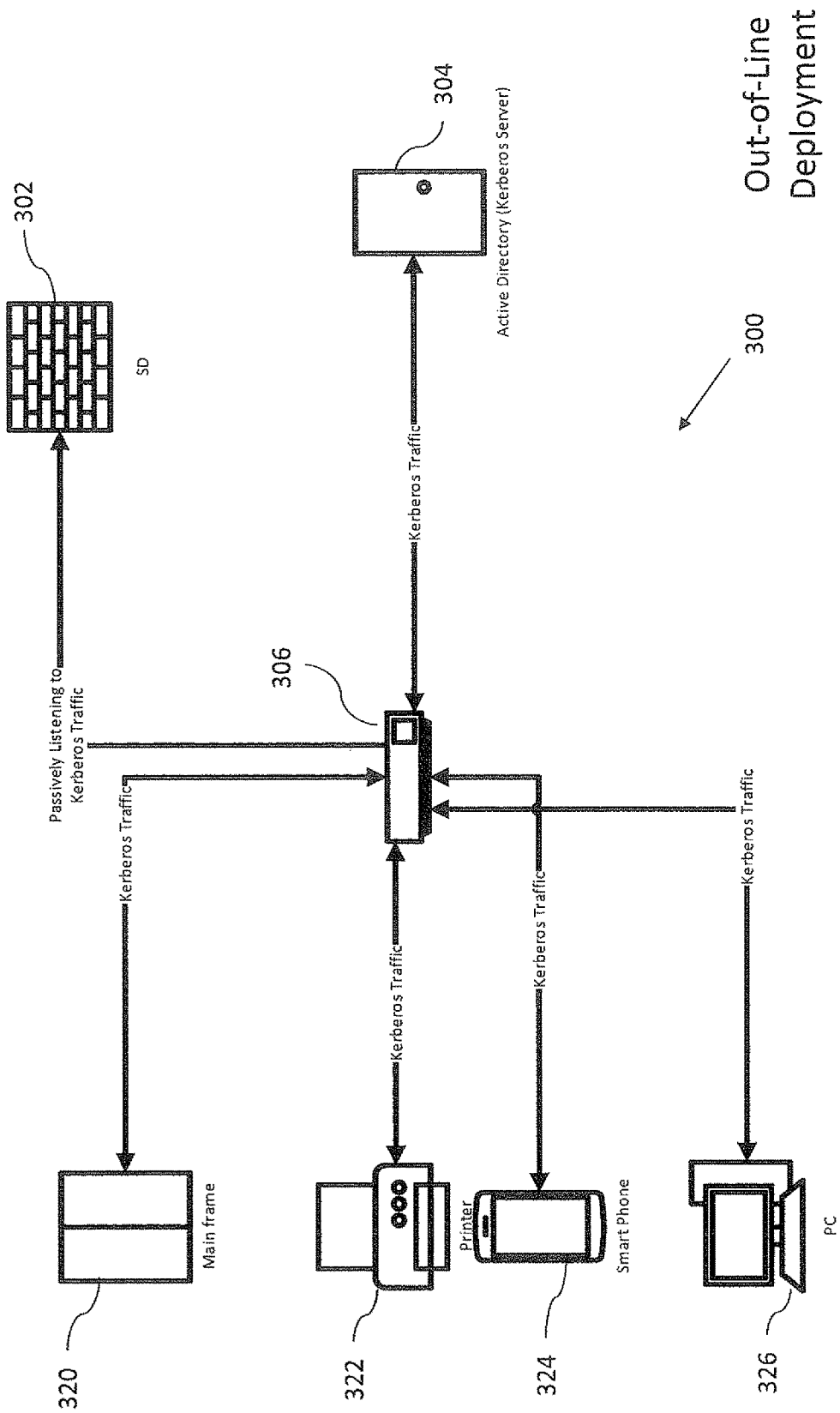
FIG. 3 is a schematic block diagram of an exemplary Active Directory/Directory Services network environment with an out-of-line deployment of the immediate invention.

FIG. 3 is a schematic block diagram of an exemplary AD/DS network environment 300 with an out-of-line or 'passive' deployment of the immediate invention. A passive Security Device (SD) 302, is deployed within the network environment. The SD monitors Kerberos traffic from client network entities 320-326 to an AD 304. Exemplary client network entities depicted in the Figure include: a mainframe 320, a network printer 322, a smartphone 324, and a desktop PC 326. In the depicted exemplary network configuration, all the client Kerberos traffic runs through a switch 306 before reaching the AD. SD 302 passively monitors the Kerberos traffic, or more precisely, monitors a copy of the traffic.

SD 302 is able to recouple an authorization request together with a respective, original authentication request. By recoupling the authorization and authentication requests, the SD is able to detect decoupling attacks against the Authentication and Authorization system. A TGT is supplied to the client from the AD in the AS_REP message and the client subsequently copies the TGT (or at least a shallow copy of the TGT) in all authorization requests, in the TGS_REQ messages.

The essential fact that allows the system to recouple the authorization request with the respective authentication request is that the TGT is copied exactly, or at least a shallow copy of the TGT is included in the authorization request. As such, the SD is able to cross-reference the relevant authentication information in the authentication transaction (the AS_REQ-AS_REP message exchange) with the corresponding information in the authorization transaction (the TGS_REQ-TGS_REP message exchange). The fact that TGT is encrypted is irrelevant for recoupling purposes, as the SD does not need to know the contents of the TGT, the SD only needs to be able to identify that the same TGT is being used across different transactions. The selected information from the authentication transaction is compared to the corresponding information in the authorization transaction and if any discrepancies are found, or if the authentication information cannot be found, then the SD indicates that a security event has occurred.

Figure 4:
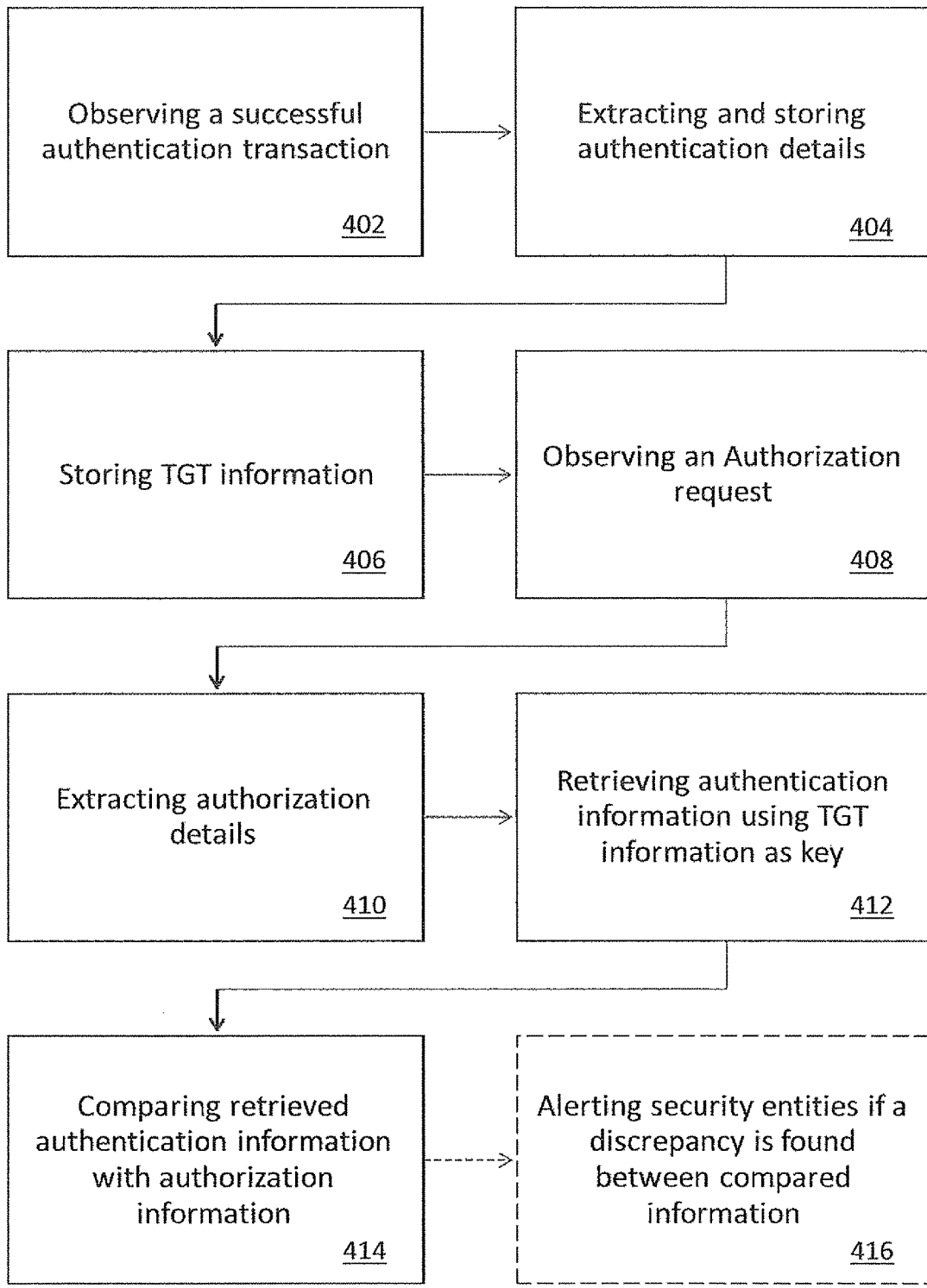
FIG. 4 is a flow diagram of an exemplary Security Device algorithm.

FIG. 4 is a flow diagram of an exemplary SD algorithm.

Step 402—observing a successful authentication transaction (the AS_REQ-AS_REP message exchange).

Step 404—extracting and storing the authentication details from the authentication transaction. The authentication details include, but are not limited to: User Name, Source Machine, Authentication Date and Time and the TGT. The TGT information is stored in Step 406 to be used as a key for retrieving the corresponding authentication information. The TGT information is saved for the validity period of the ticket (e.g. 10 hours by default, on Windows systems).

Step 408—observing an authorization request (TGS_REQ).

Step 410—extracting the authorization details from the authorization request. The authorization information includes, but is not limited to: the Source Machine, Authorization Date and Time and a copy of the authentication TGT.

Step 412—retrieving the authentication information, including the TGT by using the copy of the TGT as a key or reference for locating the stored authentication information which includes the corresponding TGT.

Step 414—comparing or cross-referencing the retrieved authentication information with the extracted authorization information to see if there are any discrepancies between the two sets of information (as described in further detail below).

Step 416—If a discrepancy is found, then a security event alert is invoked, alerting the relevant entities (e.g. SD administrator, security administer and/or other systems or modules) within the system to block the authorization request or otherwise deal with the security event.

Figure 5:
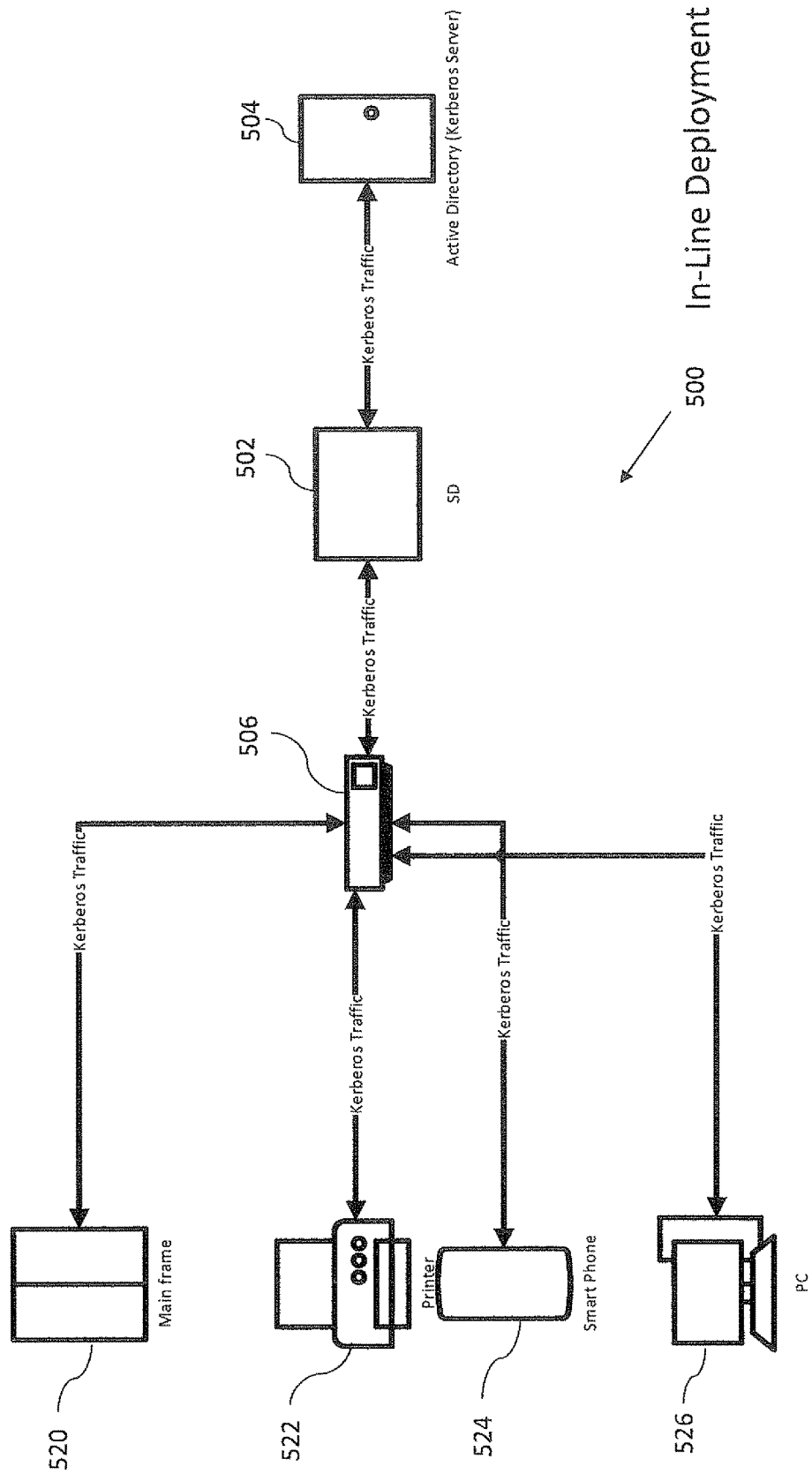
FIG. 5 is a schematic block diagram of an exemplary AD/DS network environment with an inline deployment of the immediate invention.

FIG. 5 is a schematic block diagram of an exemplary AD/DS network environment 500 with an in-line deployment of the immediate invention. A Security Device (SD) 502, is deployed within the network environment. The SD intercepts and monitors Kerberos traffic from client network entities 520-526 to an AD 504. Exemplary client network entities depicted in the Figure include: a mainframe 520, a network printer 522, a smartphone 524, and a desktop PC 526. In the depicted network configuration, all the client Kerberos traffic runs through a switch 506 and then through the SD 502, before reaching the AD.

SD 502 is configured to re-couple an authorization request together with a respective/corresponding, original authentication request. By re-coupling the authorization and authentication requests, the SD is able to detect decoupling attacks against the Authentication and Authorization system. The TGT is supplied to the client from the AD in the AS_REP message and quoted by the client on the subsequent authorization requests in the TGS_REQ message.

What follows is a number of examples where the SD detects decoupling attacks against Kerberos by re-coupling Kerberos authentication and authorization:

Stale Authentication Data ("Zombie User") Attack Detection

When an attacker uses the stale authentication data in a TGS_REQ, the SD is able to retrieve the original authentication transaction that created the TGT and get the original user name. Using the original name the SD can assess the status of the user in the AD. If the user is "not in good standing" (e.g. expired, deleted, disabled, etc.) then the SD flags the transaction as "Zombie User" attack. The TGS_REQ message does not contain the user name for reference (to check whether the user is in good standing or not). The innovative method of the present invention enables the SD to retrieve the user name using the re-coupling process.

Stolen Authentication Data ("Pass-the-Ticket") Attack Detection

When an attacker uses a stolen TGT in a TGS_REQ message, the SD is able to retrieve the original authentication transaction that created the TGT and look up the identity of the original source machine. The SD compares the name of the original authentication request source machine with the name of the authorization source machine. If the machine names are not the same, the SD flags the transaction as a "Pass-the-Ticket" type attack.

Forged Authentication Data ("Golden Ticket") Attack Detection

When an attacker uses a forged TGT in a TGS_REQ message, the SD tries to retrieve the original authentication transaction that created the TGT. The SD will not be able to find the original authentication transaction as the transaction does not exist/never took place. When the retrieval operation fails, the SD flags the transaction as a "Golden Ticket" type attack.

Figure 6:
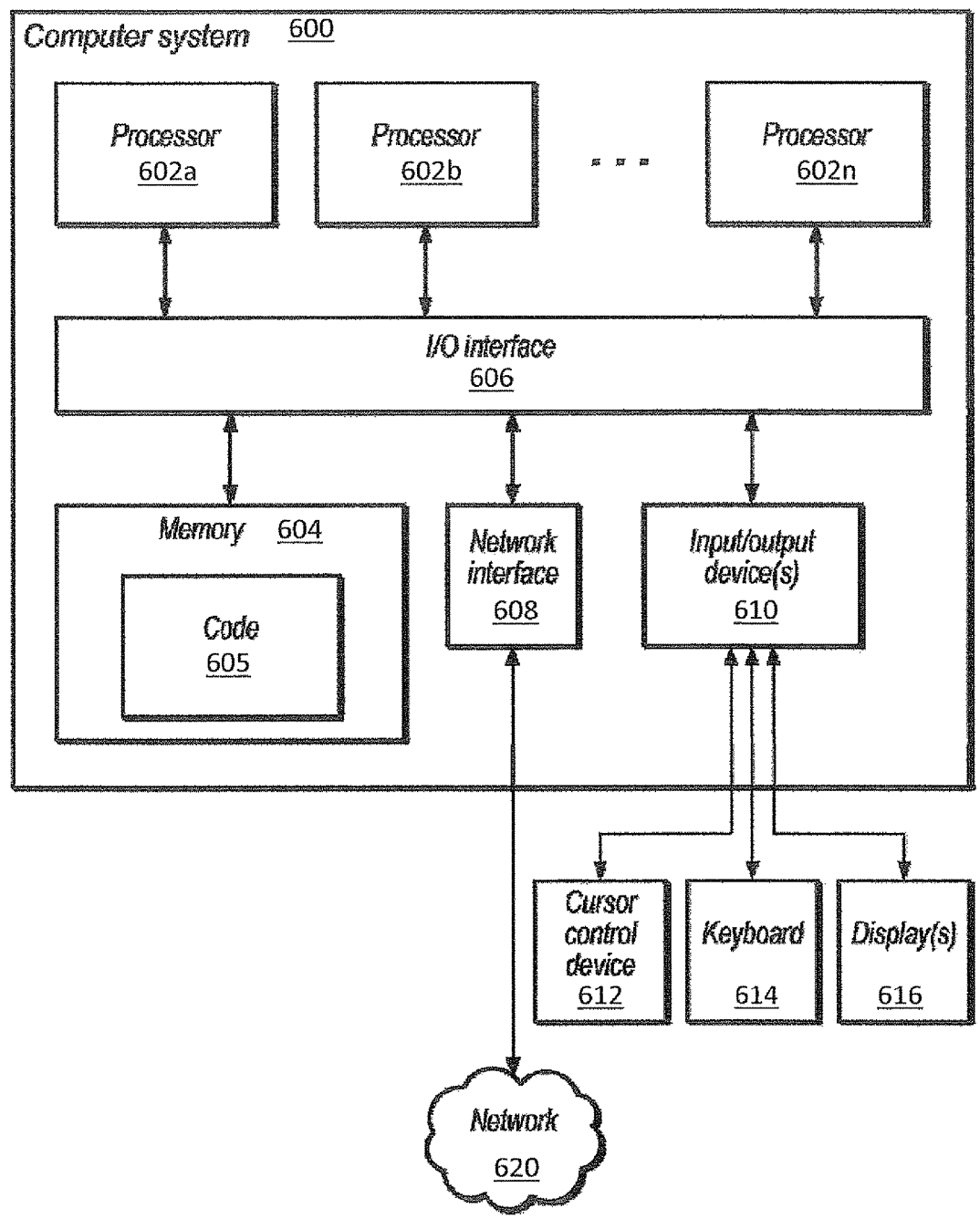
FIG. 6 is a block diagram of an exemplary computer device.

One examplary embodiment of a computer system including computer-accessible media is illustrated in FIG. 6. Computer system 600 may correspond to an example configuration of a computing device upon which SD 302/502 can be embodied. Correspondingly, in various embodiments, the functionality of any of the various modules or methods described above and below may be implemented by one or several instances of computer system 600.

In the illustrated embodiment, computer system 600 includes one or more processors 602 coupled to a system memory 604 via an input/output (I/O) interface 606. Computer system 600 further includes a network interface 608 coupled to I/O interface 606. In various embodiments, computer system 600 may be a uniprocessor system including one processor 602, or a multiprocessor system including several processors 602 (e.g., two, four, eight, or another suitable number). Processors 602 may be any suitable processor capable of executing instructions. For example, in various embodiments processors 602 may be a general-purpose or embedded processor implementing any of a variety of instruction set architectures (ISAs), such as the x86, PowerPC™, SPARC™, X64 or MIPS™ ISAs, or any other suitable ISA. In multiprocessor systems, each of processors 602 may commonly, but not necessarily, implement the same ISA.

System memory 604 may be configured to store instructions and data accessible by processor 602. In various embodiments, system memory 604 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above and below, are shown stored within system memory 604 as code or modules 605. It is noted that in some embodiments, code/modules 605 may include instructions and data implementing desired functions that are not directly executable by processor 602 but are represented or encoded in an abstract form that is translatable to instructions that are directly executable by processor 602.

In one embodiment, I/O interface 606 may be configured to coordinate I/O traffic between processor 602, system memory 604, and any peripheral devices in the device, including network interface 608 or other peripheral interfaces. In some embodiments, I/O interface 606 may perform any necessary protocol, timing or other data transformations to convert data signals from one component (e.g., system memory 604) into a format suitable for use by another component (e.g., processor 602). In some embodiments, I/O interface 606 may include support for devices attached through various types of peripheral buses, such as a variant of the Peripheral Component Interconnect (PCI) bus standard or the Universal Serial Bus (USB) standard, for example. In some embodiments, the I/O interface 606 may be coupled to an Input/Output device interface 610. Input/output device interface may be couples to peripheral devices, such as cursor control device 612 (e.g. a mouse, pointing device etc.), a keyboard 614, one or more displays 616 and other devices known in the art. In some embodiments some or all of the functionality of I/O interface 606, such as an interface to system memory 604, may be incorporated directly into processor 602. In some embodiments some or all of the functionality of Input/output device interface 610, such as an interface to cursor control device 614, display 616, keyboard NI 614 may be incorporated directly into computer system 600 and controlled by processor 602 (e.g. in a touch screen device such as a smartphone or tablet computer).

Network interface 608 may be configured to allow data to be exchanged between computer system 600 and other devices attached to a network 620 (e.g. such as depicted in FIG. 5 or 6), such as other computer systems, for example. In various embodiments, network interface 608 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 604 may be one embodiment of a computer-accessible/computer-readable storage medium configured to store instructions and data as described above. However, in other embodiments, instructions and/or data may be received, sent or stored upon different types of computer-accessible storage media. Generally speaking, a computer-accessible storage medium may include storage media or memory media such as magnetic or optical media, e.g., disk or CD/DVD-ROM coupled to computer system 600 via I/O interface 606. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 600 as system memory 604 or another type of memory. A computer-accessible storage medium may generally be accessible via transmission media or signals such as electrical, electromagnetic, or digital signals, conveyed via a communication medium such as a network and/or a wireless link, and may be implemented via network interface 608.

All methods described herein can be performed on one or more electronic processors and/or computers working with each other. These processors/computers can be in the same or different physical locations connected by any type of computer communications network.

All features of documents that are incorporated by reference can be combined without limitation with each other and with features described in the text fully set forth herein. Features described herein can be combined with any feature (s) in the documents incorporated by reference without limitation.

It is noted that the order of any of the operations described herein can be performed in any order. Any operation described herein can also be optional. All flowcharts herein are not intended to illustrate the only possible implementation, and modifications and deviations can be added which include any feature described herein or based on well-established principles. For example, while endless loops may be theoretically possible in some flowcharts, in reality such situations could be handled using common sense approaches. Any embodiments herein can also be stored in electronic form and programs and/or data for such can be stored on any type of computer readable storage medium (e.g. CD-ROM, DVD, disk, etc.)

The descriptions provided herein also include any hardware and/or software known in the art and needed to implement the operations described herein. All components illustrated herein may also optionally communicate with any other component (either illustrated/described herein or not described but known in the art).

What is claimed is:

1. A method for recoupling Kerberos Authentication and Authorization requests from a client computer to a key domain controller (KDC), the method comprising the steps of:
   (a) associating, with a security computing device, an authentication server request with its corresponding authentication server reply to observe an authentication transaction comprising the authentication server request and its corresponding authentication server reply, a Ticket Granting Ticket (TGT) being included in the authentication server reply;
   (b) extracting, with the security computing device, authentication information from the authentication transaction and storing a copy of the TGT and the authentication information in the KDC, the authentication information not including the TGT;
   (c) observing, with the security computing device, a ticket granting server request containing the TGT;
   (d) extracting, with the security computing device that is independent of the client computer and the KDC, authorization information and a copy of the TGT from the ticket granting server request from the client computer, the authorization information not including the TGT;
   (e) retrieving, with the security computing device, authentication information including said TGT from the KDC, said authentication information having been previously extracted from the authentication transaction associated with the ticket granting server request and stored in the KDC; and
   (f) cross-referencing, with the security computing device, said extracted authorization information from the client computer with said retrieved authentication information from the KDC, such that a discrepancy between said cross-referenced information invokes a security event alert and outputs the security event alert to an administrator for display.

2. The method of claim 1, wherein said security event alert is invoked based on a failure to retrieve said stored authentication information.

3. The method of claim 1, wherein said authentication transaction is passively observed by observing a copy of the authentication transaction.

4. The method of claim 1, wherein said authentication transaction is intercepted.

5. The method of claim 1, wherein said discrepancy includes said authentication information including stale authentication data.

6. A non-volatile computer readable medium storing computer readable code that upon execution of the code by a computer processor in a security computing device, causes the computer processor to perform a method for recoupling Kerberos Authentication and Authorization requests from a client computer to a KDC, the method comprising the steps of:
   (a) associating, with the security computing device, an authentication server request with its corresponding authentication server reply to observe an authentication transaction comprising the authentication server request and its corresponding authentication server reply, a Ticket Granting Ticket (TGT) being included in the authentication server reply;
   (b) extracting, with the security computing device, authentication information from the authentication transaction and storing a copy of the TGT and the authentication information in the KDC, the authentication information not including the TGT;
   (c) observing, with the security computing device, a ticket granting server request containing the TGT;
   (d) extracting, with the security computing device that is independent of the client computer and the KDC, authorization information and a copy of the TGT from the ticket granting server request from the client computer, the authorization information not including the TGT;
   (e) retrieving, with the security computing device, authentication information including said TGT from the KDC, said authentication information having been previously extracted from the authentication transaction associated with the ticket granting server request and stored in the KDC; and
   (f) cross-referencing, with the security computing device, said extracted authorization information from the client computer with said retrieved authentication information from the KDC, such that a discrepancy between said cross-referenced information invokes a security event alert and outputs the security event alert to an administrator for display.

7. The non-volatile computer readable medium of claim 6, wherein said security event alert is invoked based on a failure to retrieve said stored authentication information.

8. The non-volatile computer readable medium of claim 6, wherein said authentication transaction is passively observed by observing a copy of the authentication transaction.

9. The non-volatile computer readable medium of claim 6, wherein said authentication transaction is intercepted.

10. The non-volatile computer readable medium of claim 6, wherein said discrepancy includes said authentication information including stale authentication data.

* * * * *